UNITED STATES PATENT OFFICE.

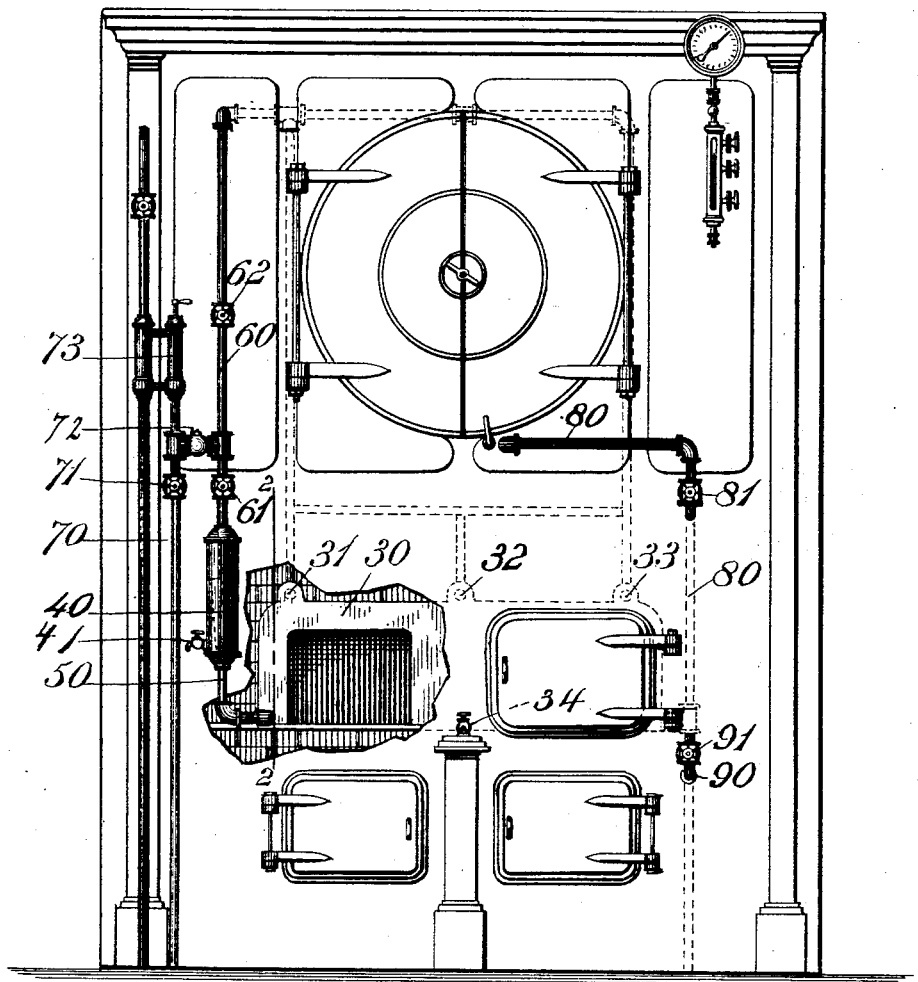

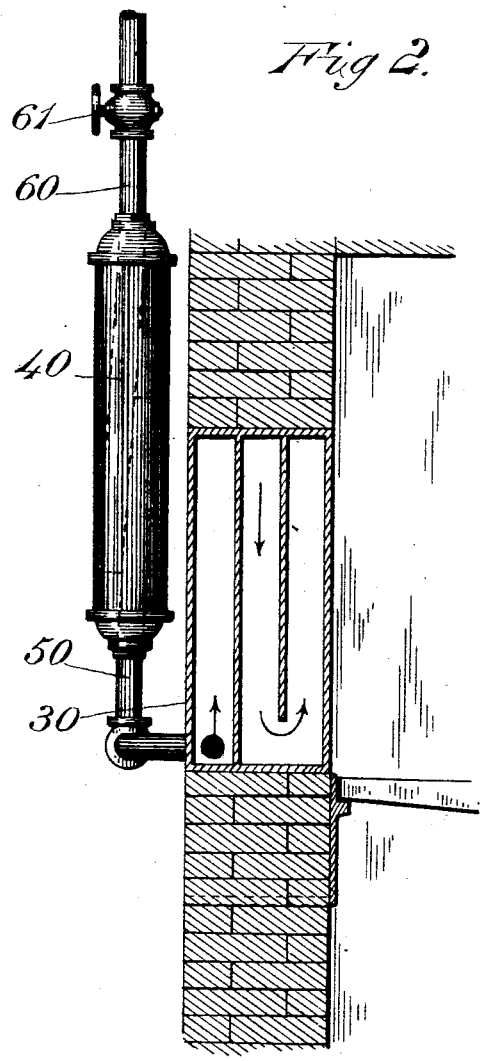

CHARLES W. McDANIEL, OF LAKEPORT, NEW HAMPSHIRE, ASSIGNOR TO THE ECONOMY FEED WATER HEATER COMPANY, OF NEW HAMPSHIRE.

FEED-WATER HEATER AND PURIFIER.

SPECIFICATION forming part of Letters Patent No. 520,211, dated May 22, 1894.

Application filed January 28, 1893. Renewed November 14, 1893. Serial No. 490,966. (No model.)

*To all whom it may concern:*

Be it known that I, CHARLES W. McDANIEL, a citizen of the United States of America, residing at Lakeport, in the county of Belknap, in the State of New Hampshire, have invented certain new and useful Improvements in Feed-Water Heaters and Purifiers, of which the following is a specification.

This invention relates to a feed-water heating and purifying apparatus for steam boilers in which the water is heated in a casing surrounding the furnace mouth or mouths.

The object of the invention is to purify the water before it enters the furnace-mouth heater and also to impart a preliminary heating thereto, so that after the feeding to the boiler has ceased for a time and the casing has become hot, cold water need not be brought at once into contact therewith.

Figure 1 of the accompanying drawings represents a front elevation of this feed-water heating and purifying apparatus in connection with a setting for a horizontal steam boiler. Fig. 2 represents a vertical transverse section of the front wall of the steam boiler furnace on line 2—2 of Fig. 1 through an end wall of the furnace-mouth feed-water heater.

The same reference numbers indicate the same parts in both figures.

The boiler setting herein shown has two furnace mouths, the front plate thereof being broken away, showing one of said mouths and a portion of the feed-water heater 30 surrounding said mouth on its sides and top. This feed-water heater may be constructed in the form of a casing of cast metal provided with interior partitions forming tortuous water channels through which the water passes on its way to the boiler, said water being heated, and at the same time the furnace mouth being protected from the heat of the fire. A water purifier and temperer 40 is disposed adjacent to the steam boiler furnace and is connected with the hollow furnace-mouth feed-water heater 30 by a pipe 50. A pipe 60 provided with valves 61 and 62 connects the temperer 40 with the boiler above the water level thereof. A supply pipe 70 leading from the source of supply or boiler feed pump is connected by a pipe 72 with the pipe 60 at a point between the valves 61 and 62. This supply pipe 70 is provided with a valve 71 below its connection with the pipe 60 and with an injector 73 above said connection. The pipe 60 receives water from the supply pipe 70 and discharges it into the purifier and temperer 40, and a pipe 50 conducts the water from the purifier and temperer to the furnace-mouth feed-water heater 30. This purifier and temperer may be of any suitable construction adapted to serve its purposes. When constructed as shown in the drawings, its induction pipe 60 discharges near its bottom and its induction pipe 50 leads out from near its top. The sediment from the water, which collects in the bottom of the purifier may be drawn off or blown out at intervals through a blow-off cock 41. A pipe 80 provided with a valve 81 connects the opposite end of the furnace-mouth casing 30 with the boiler below the water line thereof and serves to conduct the water from said casing in the boiler. A branch supply pipe 90 connected with the pipe 80 and provided with a valve 91 may serve to feed the water directly to the boiler if desired.

In the use of this apparatus, the valves 71, 61, and 81 are open and the valve 91 is closed. The valve 62 may be either open or closed. The water passes through the purifier 40, thence through the pipe 50 to the left hand end of the hollow furnace-mouth casing, thence through the water channels therein, thence through the pipe 80 into the boiler. In passing through the purifier and temperer the water is relieved of more or less sediment, and in passing through the casing around the furnace-mouth or mouths, it absorbs more or less heat from the fire. This absorption of heat serves the double purpose of protecting the brick work around the furnace-mouth and elevating the temperature of the feed water to a point equal to or approximating that of the water in the boiler. When it becomes necessary to stop the feeding to avoid a surplus of water in the boiler, the valve 71 is closed and the valves 62 and 81 may be open. In that case a circulation will go on in a reverse direction through the casing 30, the water in the casing being converted into steam and passing into the boiler through the pipe 62 and through the drums 31, 32 and 33, and through the pipes shown in dotted lines in Fig. 1 connecting said drums with the steam space of the boiler, the water being resupplied to the casing 30 through the pipe 80. When, however, the valves 71 and 81 are closed and there is no circulation through the casing, the water therein may be drawn off through the cock 34, or may be converted into steam and pass into the boiler above the water line through the open pipe 60 or through the said pipes shown in dotted lines in Fig. 1. In this case the furnace-mouth casing may become quite hot after the water has evaporated or been drawn off therefrom, so that when feeding is renewed, the sudden admission of very cold water, such as might come through the supply pipe in cold weather, would be injurious. The water that has stood in the purifier adjacent to the furnace within the boiler room has become warmed or tempered and may be conducted into the hot furnace-mouth casing without injury thereto.

I claim as my invention—

1. The combination of a steam boiler, a steam boiler furnace, a furnace mouth casing provided with interior water channels disposed in the mouth of said furnace, a pipe connecting said casing with said boiler, a water receptacle disposed at the front of said furnace in position to receive radiant heat therefrom, said receptacle being connected with said casing, and a feed pipe connected with said receptacle.

2. The combination of a steam boiler, a furnace for heating said boiler, a furnace mouth casing set in the mouth of said furnace and provided with interior water channels, a pipe connecting said casing with said boiler, a water receptacle disposed at the front of said furnace in position to receive radiant heat therefrom, a pipe directly connecting said receptacle with said casing, said pipe opening near the top of said receptacle, and a feed pipe connected with said receptacle and discharging near the bottom thereof, substantially as set forth.

CHARLES W. McDANIEL.

Witnesses:
H. B. QUINBY,
ALBERT C. MOORE.